US008826223B2

(12) United States Patent
Dube et al.

(10) Patent No.: US 8,826,223 B2
(45) Date of Patent: Sep. 2, 2014

(54) TECHNIQUES FOR OBJECTIVE ASSESSMENT AND IMPROVEMENT OF SOFTWARE QUALITY

(75) Inventors: Parijat Dube, Yorktown Heights, NY (US); Eitan Daniel Farchi, Pardes Hana (IL)

(73) Assignee: International Business Machines Corporation, Armonk, NY (US)

( * ) Notice: Subject to any disclaimer, the term of this patent is extended or adjusted under 35 U.S.C. 154(b) by 111 days.

(21) Appl. No.: 13/449,431

(22) Filed: Apr. 18, 2012

(65) Prior Publication Data

US 2013/0283258 A1    Oct. 24, 2013

(51) Int. Cl.
G06F 9/44    (2006.01)
G06F 9/445   (2006.01)

(52) U.S. Cl.
USPC ........... 717/101; 717/102; 717/104; 717/174; 717/175

(58) Field of Classification Search
None
See application file for complete search history.

(56) References Cited

U.S. PATENT DOCUMENTS

| | | | | |
|---|---|---|---|---|
| 7,240,325 | B2 * | 7/2007 | Keller ........................... | 717/104 |
| 7,441,230 | B2 | 10/2008 | Kainz et al. | |
| 8,006,222 | B2 * | 8/2011 | Ruhe ............................ | 717/101 |
| 8,336,024 | B2 * | 12/2012 | Kannan et al. ................ | 717/107 |
| 8,533,704 | B2 * | 9/2013 | Wookey ........................ | 717/174 |
| 8,543,998 | B2 * | 9/2013 | Barringer ..................... | 717/175 |
| 2005/0102667 | A1 * | 5/2005 | Barta et al. ................... | 717/174 |
| 2005/0120344 | A1 * | 6/2005 | Asare et al. .................. | 717/174 |
| 2006/0190417 | A1 * | 8/2006 | Hilkemeyer et al. ......... | 705/400 |
| 2007/0033201 | A1 | 2/2007 | Stienhans | |
| 2007/0074151 | A1 | 3/2007 | Rivera et al. | |
| 2008/0127087 | A1 | 5/2008 | Brookins et al. | |
| 2008/0201705 | A1 | 8/2008 | Wookey | |
| 2008/0216069 | A1 | 9/2008 | Leymann et al. | |
| 2009/0106748 | A1 | 4/2009 | Chess et al. | |
| 2009/0125872 | A1 * | 5/2009 | Kannan et al. ................ | 717/101 |
| 2009/0138843 | A1 * | 5/2009 | Hinton et al. ................. | 717/101 |
| 2009/0144728 | A1 | 6/2009 | Felts | |

(Continued)

OTHER PUBLICATIONS

Kessler, C., et al., Outside-in Software Development: Chapter 4—Making Products Consumable, IBM Press, 2008, 35 pages, [retrieved on Apr. 21, 2014], Retrieved from the Internet: <URL:http://www.safaribooksonline.com/>.*

(Continued)

*Primary Examiner* — Thuy Dao
*Assistant Examiner* — Geoffrey St Leger
(74) *Attorney, Agent, or Firm* — Preston Young; Michael J. Chang, LLC

(57) ABSTRACT

Techniques for quantifying and improving consumability of software bundles are provided. In one aspect, a method for quantifying a consumability of a software bundle is provided which includes the following steps. Constituent software products of the bundle are identified. Software components an installation of which is a pre-requirement for an installation of the software products are identified. Software units an installation of which is a pre-requirement for an installation of the software components are identified. Dependency graphs are created for the software components. The dependency graphs for the components are merged to create dependency graphs for the products. The dependency graphs for the products are merged to create a dependency graph for the bundle. The dependency graph for the bundle is used to quantify the consumability of the bundle.

18 Claims, 7 Drawing Sheets

(56) References Cited

U.S. PATENT DOCUMENTS

| | | | |
|---|---|---|---|
| 2009/0276286 A1 | 11/2009 | Bortolotti et al. | |
| 2010/0050156 A1 | 2/2010 | Bonanno et al. | |
| 2010/0088663 A1* | 4/2010 | Hammer et al. | 717/101 |
| 2011/0239212 A1* | 9/2011 | Wookey | 717/178 |
| 2012/0060142 A1* | 3/2012 | Fliess et al. | 717/102 |
| 2012/0131540 A1* | 5/2012 | Mendis | 717/101 |

OTHER PUBLICATIONS

Stan: Structure Analysis for Java Version 2, White Paper, Odysseus Software, Fall 2009, 16 pages, [retrieved on Oct. 30, 2013], Retrieved from the Internet: <URL:http://stan4j.com/papers/stan-whitepaper.pdf>.*

Kessler et al., "Outside-in Software Development: A Practical Approach to Building Successful Stakeholder-based Products," IBM Press, chapter 2 (2008).

Grechanik et al., "Analyzing Software Development as a Noncooperative Game," 6th International Workshop on Economics-Driven Software Engineering Research (EDSER6), Edinburgh, Scotland, UK, May 2004.

Gonzalez-Barahona et al., "Macro-level software evolution: a case study of a large software compilation," Empir Software Eng (2009) 14:262-285.

Jonge, "Build-level Component-Based Software Engineering," Technical Report UU-CS-2004-046 Institute of Information and Computing Sciences, Utrecht University (Oct. 27, 2004).

VanderLei, "Building Service Oriented Bundle Architectures," eclipseCON 2007 (Mar. 5, 2007).

* cited by examiner

FIG. 2
200

| PRODUCT | SUPPORTED VERSION | MONITORING SERVER | PORTAL SERVER | PORTAL DESKTOP CLIENT | PORTAL BROWSER CLIENT |
|---|---|---|---|---|---|
| IBM JRE | JRE 1.4.2+ | X | X | X | X |
| MICROSOFT INTERNET EXPLORER | VERSION 6.0 | X | | | X |
| DB2 UDB OR MSSQL 2000+ OR ORACLE 9.2 OR 10.1 (FOR TDW ONLY) | DB2 VERSION 8 | | X | | |
| IBM TIVOLI ENTERPRISE CONSOLE | VERSION 3.9 | | | | |
| FOR TCP/IP COMMUNICATION * WINDOWS 2000 PROFESSIONAL OR SERVER WITH SP3 OR ABOVE * MS WINSOCK v1.1 OR LATER * MS TCP/IP PROTOCOL STACK | | X | X | X | X |

FIG. 3A
300A

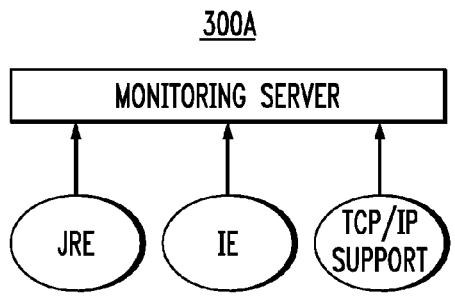

$$C_{MS} = \frac{1}{4}$$

FIG. 3B
300B

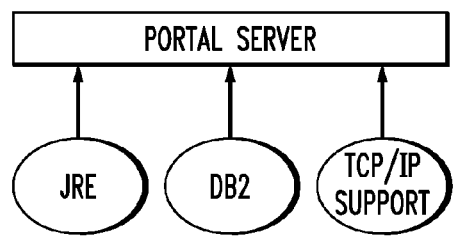

$$C_{PS} = \frac{1}{4}$$

300C $C_{PDC} = \frac{1}{3}$

300D $C_{TEC} = 1$

300E $C_{PBC} = \frac{1}{4}$

400

$$C_{ITM} = \frac{1}{C_{MS}^{-1} + C_{PS}^{-1} + C_{PDC}^{-1} + C_{PBC}^{-1} + C_{TEC}^{-1} - \underbrace{(4-1)}_{JRE} - \underbrace{(2-1)}_{IE} - \underbrace{(1-1)}_{DB2} - \underbrace{(3-1)}_{TCP/IP\ SUPPORT}} = \frac{1}{4+4+3+4+1-3-1-2} = \frac{1}{10}$$

600

700

800

900

TECHNIQUES FOR OBJECTIVE ASSESSMENT AND IMPROVEMENT OF SOFTWARE QUALITY

FIELD OF THE INVENTION

The present invention relates to consumability and more particularly, to techniques for quantifying and improving consumability of software bundles.

BACKGROUND OF THE INVENTION

Many software products are grouped together to create a "software bundle" targeting a business scenario during sales and services. The bundle has a solution for single or multiple levels of the software stack for the target business scenario, such as Services Level, Monitoring and Management Level, Virtualization Level, operating system (OS) Level, Network Level and/or Hardware Level. When creating the software bundle, a decision needs to be made on the combination of software products (and their releases) that should be grouped into the bundle. For each level, there may be potentially many candidate products that can be part of the bundle. Each product installation, configuration, operation and maintenance requires resources (at the customer end if the bundle is sold as a product or at the service provider end if the bundle is offered as a service). Different products have different dependencies on other products required for their installation. Further, each product may be integrated to only a subset of candidate products for other layers.

Consumability is a measure of a customer's end-to-end experience with a solution. Key consumability aspects include: 1) identifying the right product, 2) acquiring the product, 3) installing and configuring the product, 4) using and administering the product, 5) troubleshooting problems with the product and 6) updating the product (e.g., installing fix packs).

An important criteria when evaluating candidate bundles for a target business scenario is their value to the customers. The value of a bundle/product to a customer depends on its consumability as well as the technical features offered. Further the value is a subjective measure, depending on the size of the customer (i.e., large enterprise, small-to-medium (SMB) or home user) and the market (i.e., financial, retail or data centers) where the customer operates. A large firm may be willing to buy a tool that is difficult to install and requires more man hours to learn it and make it work, but offers advanced features (as compared to a tool that is easier to install and make work but offers less features and flexibility). On the other hand, SMB firms tend to buy other tools which offer less features but are easier to install and work with and thus have high consumability.

It is desirable to have a solution with a higher consumability so as to improve the user experience. Thus, firms tend to invest in improving consumability of products/solutions constituting a software bundle during the sales phase. Normally there is a limited budget to invest and an important decision is to improve consumability of those products which have a higher impact on user experience. Thus there is a need to identify software products for improving consumability and the amount of resources to allocate to them from a limited budget.

Therefore, techniques to improve consumability of software bundles for a target business scenario would be desirable.

SUMMARY OF THE INVENTION

The present invention provides techniques for quantifying and improving consumability of software bundles. In one aspect of the invention, a method for quantifying a consumability of a software bundle is provided. The method includes the following steps. Constituent software products of the bundle are identified. Software components an installation of which is a pre-requirement for an installation of the software products are identified. Software units an installation of which is a pre-requirement for an installation of the software components are identified. A dependency graph is created for the software components, wherein a dependency graph for a given one of the software components contains all of the software units the installation of which is a pre-requirement for the installation of the given software component. The dependency graphs for the software components are merged to create dependency graphs for the software products, wherein a dependency graph for a given one of the software products contains all of the software units and software components the installation of which is a pre-requirement for the installation of the given software product. The dependency graphs for the software products are merged to create a dependency graph for the software bundle, wherein the dependency graph for the software bundle contains all of the software units, software components and software products the installation of which is a pre-requirement for the installation of the software bundle. The dependency graph for the software bundle is used to quantify the consumability of the software bundle.

A more complete understanding of the present invention, as well as further features and advantages of the present invention, will be obtained by reference to the following detailed description and drawings.

BRIEF DESCRIPTION OF THE DRAWINGS

FIG. 2 is a chart identifying the pre-requirements (pre-reqs) for some exemplary software components according to an embodiment of the present invention;

FIGS. 3A-E are pre-req graphs for each of the components in FIG. 2 and associated consumability according to an embodiment of the present invention;

DETAILED DESCRIPTION OF PREFERRED EMBODIMENTS

Provided herein are techniques to improve consumability of software bundles for a target business scenario. The present techniques target the following questions. How to improve consumability of software bundles for a target business scenario? What consumability criteria should be prioritized? What products and what features of those products are more critical for a given consumability criteria? How limited resources to improve consumability should be divided among those products and their features that improve consumability the most? The problem becomes more challenging when the bundle is targeting more than one business scenario, each with a different consumability criteria. In this case, should the potential revenue that can be generated by a business scenario be taken into account when doing resource allocation for improving consumability?

Figure 1:
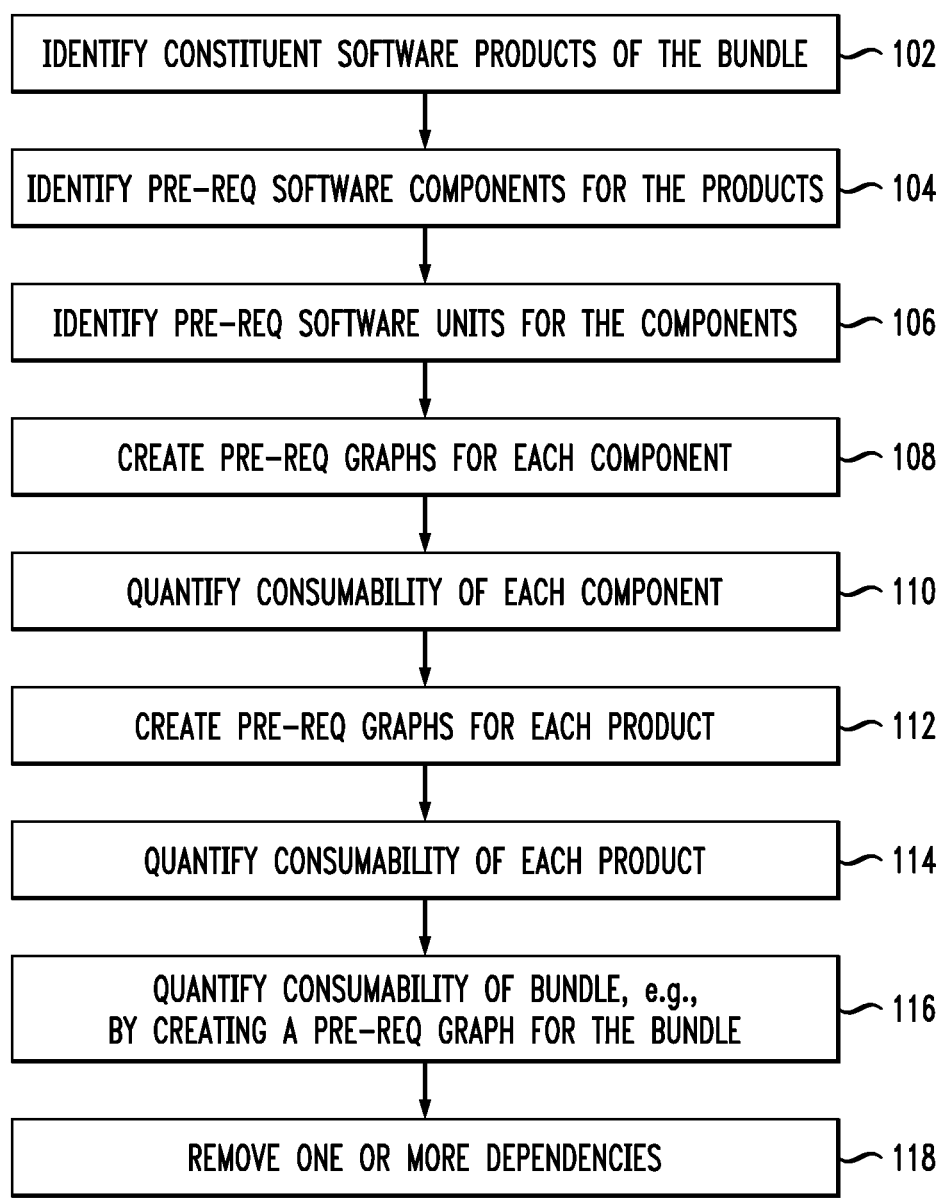
FIG. 1 is a diagram illustrating an exemplary methodology for quantifying consumability of a software bundle according to an embodiment of the present invention.

FIG. 1 is a diagram illustrating exemplary methodology 100 for quantifying consumability of a software bundle. As highlighted above, consumability is a measure of a customer's end-to-end experience with a solution. See, for example, Kessler et al., "Outside-in Software Development: A Practical Approach to Building Successful Stakeholder-based Products," IBM Press, chapter 2 (2008) (hereinafter "Kessler"), the contents of which are incorporated by reference herein. In step 102, the constituent products of the software bundle are identified. As will be described in detail below, the consumability of the bundle will be based on the consumability of its constituent products and components.

A software product is a combination of many software components, and a software bundle is composed of many software products. The present techniques are based on the notion that the consumability of a software component may be known in isolation, e.g., the cost of its installation, the consumability of a software product composed of many components is a function of the consumability of itself and all of its dependencies (see below), and that the consumability of a software bundle composed of many products for a given business scenario is a function of the consumability of its constituent products.

Consumability may be defined and quantified based on installation dependency. In other words, the dependency between two solutions is due to the requirement that one needs to be installed before the other can be installed. Consumability may also be defined and quantified (subjectively) based on stakeholder (e.g., customer) preferences. See, for example, FIG. 10, described below.

According to an exemplary embodiment, in step 104, the software components of each of the software products (from step 102) are identified. These components are also referred to herein as pre-requirements (or pre-reqs for short) because the installation of the components is a pre-requirement for the installation of the software products. In general, pre-reqs (also known as software units) for a software product/component are solutions (i.e., software components, products, protocol stacks, libraries, etc.) the installation of which is a pre-requirement for the installation of the software product/component. In step 106, software units the installation of which is a pre-requirement for installation of the components are identified. Thus, by way of example only, if A, B and C are required for the installation of component D, then A, B and C would be identified as pre-reqs for component D in this step (see, for example, FIGS. 3A-E, described below).

In step 108, pre-req graphs are then created for each of the components. The pre-req graphs are dependency graphs with nodes and edges. In the pre-req graph of a component, there is one node for the component and a node for each of the software units (pre-reqs) identified in step 106. There is an edge from a software unit node to the component node representing that the software unit is a pre-req for the installation of the component. This is a directed edge from the pre-reqs to the component. These pre-req dependency graphs determine the set of software units that needs to be installed in order to realize the business scenario and their dependencies.

In step 110, the consumability of each component is quantified in terms of standard consumability attributes (see, e.g., Chapter 2 of Kessler) of its pre-reqs. For example, one can look at the number of nodes in the pre-req graph for each component (see below). One can also look at the stakeholders' (subjective) preferences when quantifying consumability of each component (such as how stakeholders value a component and how stakeholders rank the consumability attributes (see FIG. 10, described below)). In step 112, a pre-req dependency graph for each of the products is created by merging the pre-req graphs of its components. In step 114, the consumability of each of the products is then quantified. The consumability of a product can be defined either in terms of the consumability of its constituent components or in terms of the attributes of the pre-reqs of its components. For example, the consumability of the product can be quantified based on the number of its pre-reqs and/or based on installation and configuration costs. In step 116, the consumability of the bundle is quantified, for example, by merging the dependency graphs of the products constituting the bundle to create a pre-req dependency graph for the bundle as a whole. Again the consumability of the bundle can be defined either in terms of the consumability of its constituent products and/or in terms of consumability of the components constituting its constituent products and/or in terms of consumability of the pre-reqs constituting the components which in turn constitute the products of the bundle.

In step 118, optionally, one or more dependencies can be removed so as to improve the consumability of the dependency graph for a given business scenario. For example, if more than one version of the same product is present, then the dependency can be upgraded to the most updated version so as to simplify the graph and improve consumability. Removing dependencies to improve consumability is described in detail below.

According to one exemplary embodiment, wherein component consumability of the product is based on number of pre-reqs, which is useful when no other information about consumability of that component is available, the larger the number of pre-reqs the lower the consumability (the number of pre-reqs and the consumability are inversely related). For example, let the number of pre-reqs be n, then a possible definition of consumability can be:

$$\text{(Linear decrease) } C_1(n) = \frac{1}{(n+1)}$$

$$\text{(Quadratic decrease) } C_2(n) = \frac{1}{(n+1)^2}.$$

In this case, consumability of a product is the number of nodes in its dependency graph. For example, let $R_i$, $i=1, \ldots, N$ be the N components constituting the software product and let $M_i$ be the number of pre-reqs of component i. Let $C_{R_i}$ be the consumability index of the $R_i$ component, of the form $$C_{R_i}(n_i) = \frac{1}{(n_i + 1)}$$

where $n_i$ is the number of pre-reqs for product I. Let $D_j$ be the set of all nodes with out-degree $j=0, 1 \ldots$. If there are no nodes with degree j then $D_j$ is a null set. Then consumability of the software product is given by:

$$C_{product} = \frac{1}{\sum_{i=1}^{N} C_{R_i}^{-1} - \sum_{j=1}^{N}(j-1)|D_j|}, \quad (1)$$

wherein $|D_j|$ is the number of nodes with degree j. An example can be seen in FIG. 4, described below.

According to another exemplary embodiment, wherein consumability of the component/product is based on installation and configuration costs, the measure of consumability is the sum of installation costs of the component/product itself, its pre-reqs and the configuration cost of integrating with the pre-reqs (for example, what needs to be done to enable the component/product to connect to its pre-reqs, e.g., DB2 database being a pre-req Websphere Application Server (WAS) and one needs to also install DB2 and then make configuration changes in WAS to connect to recognize and connect to a data-source on DB2). For example, let $S_i$ be the set of pre-reqs for component $R_i$. For any pre-req $s \in S_i$, its consumability is defined as:

$$\overline{C}_s = (c_{0,s} + c_{s,R_i})^{-1}, \quad (2)$$

wherein $C_{0,s}$ is the installation cost of s and $C_{s,R_i}$ is the cost of integration of s with $R_i$. Since both installation and integration require manhours (which are quantifiable, e.g., based on a certain rate or cost per hour), the consumability of a pre-req being defined as the sum of the total cost is intuitive, as the more time required for installing and integrating the pre-req, the lower the ease of use of the pre-req. Then the cost required to install and have component $R_i$ up and running is the sum of the cost of installing the component itself which is $c_{0,R_i}$, the total cost of installing all of its pre-reqs which is $$\sum_{s \in S_i} c_{0,s}$$

and the total cost of integrating all of the pre-reqs with the component $R_i$ which is $$\sum_{s \in S_i} c_{s,R_i}.$$

Thus one measure of consumability of component $R_i$ can be the inverse of this cost given by:

$$\overline{C_{R_i}} = \left(\sum_{s \in S_i}(c_{0,s} + c_{s,R_i}) + c_{0,R_i}\right)^{-1}, \quad (3)$$

Similarly the consumability of the software product is given by:

$$\overline{C_{product}} = \frac{1}{\sum_{i=1}^{N} \overline{C}_{R_i}^{-1} - \sum_{j=1}^{N} \sum_{s \in D_j}(j-1)c_{0,s}}. \quad (4)$$

This is because the cost of installation is borne only once, no matter how many other components the software integrates to or is a pre-req of. Consumability measure C in the case where component consumability is based on number of pre-reqs is a special case of measure $\overline{C}$, with $c_{0,s}=1$ (unit installation cost for all pre-reqs and components) and $c_{s,R_i}=0$ for any s and $R_i$ (no configuration cost).

A non-limiting example is now provided to further illustrate methodology 100. In this example, International Business Machines Corporation (IBM's) Tivoli Monitoring (ITM) is being used as an exemplary product. Therefore, ITM may be one constituent product of a given software bundle (i.e., once the bundle is decomposed as in step 102 of methodology 100).

Step 104 of methodology 100 then calls for the constituent components of the product(s) to be identified. ITM contains the following software components: 1) Tivoli Enterprise Monitoring Server (Hub and Remote), 2) Tivoli Enterprise Portal Server (DB2 or MSSQL database), 3) Tivoli Enterprise Portal Client (Desktop and Browser), 4) Monitoring Agents, 5) Tivoli Data Warehouse (DB2, MSSQL or Oracle/Warehouse Proxy) and 6) Tivoli Enterprise Console Event Synchronization.

Not all of the components are required in different deployment scenarios. Not all of the components are supported on all Operating Systems. Also, different components have different hardware requirements for installation and proper functioning. For example, different components have different processor, memory and disk requirements.

Step 106 of methodology 100 then calls for identification of the software unit pre-reqs of the components. FIG. 2 is a chart 200 identifying the pre-reqs for the components Tivoli Enterprise Monitoring Server (labeled "Monitoring Server"), Tivoli Enterprise Portal Server (labeled "Portal Server"), Tivoli Enterprise Portal Client (Desktop) (labeled "Portal Desktop Client") and Tivoli Enterprise Portal Client (Browser) (labeled "Portal Browser Client"). By way of example only, Runtime Environment for Java (JRE) software is required for all of the components, i.e., Monitoring Server, Portal Server, Portal Desktop Client and Portal Browser Client. Microsoft Internet Explorer (IE) software is required for only Monitoring Server and Portal Browser Client. One of DB2 Universal Database (DB2 UDB) or Microsoft SQL Server (MSSQL) or ORACLE (collectively referred to as "DB2") software is needed for Portal Server. None of the components require Tivoli Enterprise Console software. One of Microsoft (MS) Windows, Winstock or Transmission Control Protocol/Internet Protocol (TCP/IP) stack (collectively referred to as "TCP/IP support") software is required for all of the components.

Figure 3C:
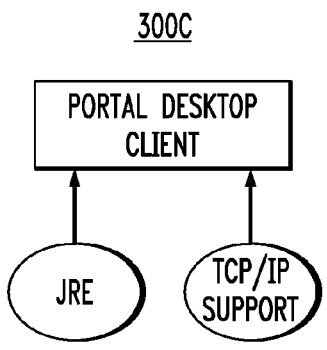
Figure 3D:
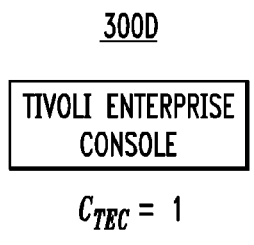
Figure 3E:
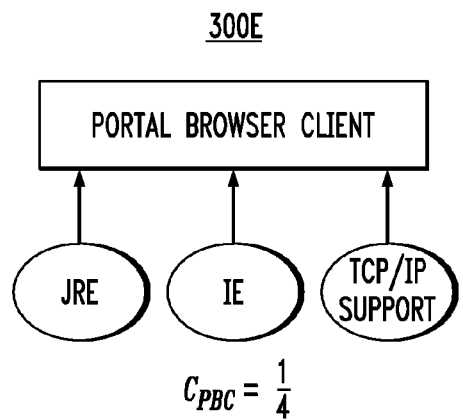

Step 108 of methodology 100 then calls for the creation of pre-req graphs for each component and step 110 calls for quantifying the consumability of each component. FIGS. 3A-E are pre-req graphs for each of the components in FIG. 2 and associated consumability. It is notable that, since the component Tivoli Enterprise Console has no pre-reqs it was not included in FIG. 2, but is shown for illustrative purposes in FIG. 3D (described below). FIG. 3A is a pre-req graph 300A showing the pre-reqs JRE, IE and TCP/IP support for the Monitoring Server component and that the consumability of the Monitoring Server component ($C_{MS}$) is ¼. FIG. 3B is a pre-req graph 300B showing the pre-reqs JRE, DB2 and TCP/IP support for the Portal Server component and that the consumability of the Portal Server component ($C_{PS}$) is ¼. FIG. 3C is a pre-req graph 300C showing the pre-reqs JRE and TCP/IP support for the Portal Desktop Client component and that the consumability of the Portal Desktop Client component ($C_{PDC}$) is ⅓. FIG. 3D is a pre-req graph 300D showing that the Tivoli Enterprise Console component has no pre-reqs and thus has a consumability ($C_{TEC}$) of 1. FIG. 3E is a pre-req graph 300E showing the pre-reqs JRE, IE and TCP/IP support for the consumability of the Portal Browser Client component and that the consumability of the Portal Browser Client component ($C_{PBC}$) is ¼.

Figure 4:
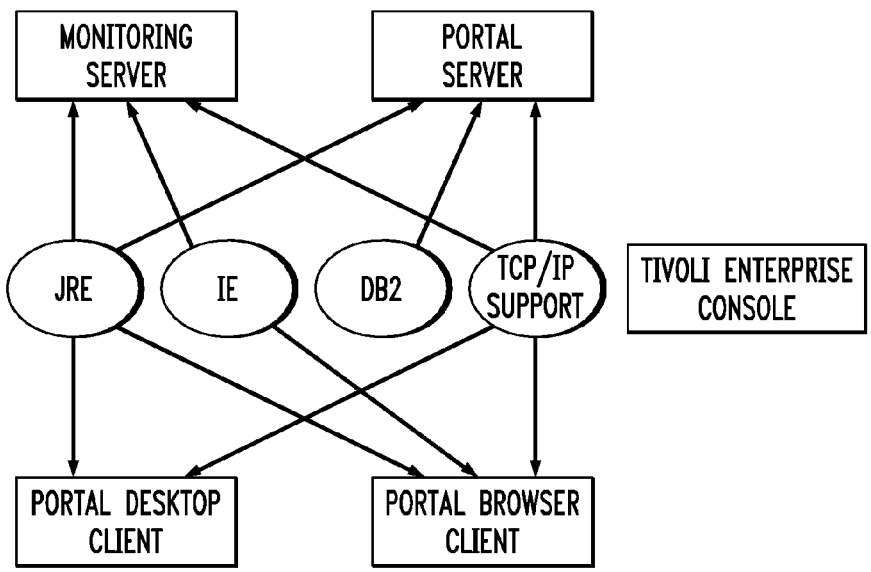
FIG. 4 is a dependency graph for an exemplary software product according to an embodiment of the present invention.

Step 112 of methodology 100 then calls for the creation of a dependency graph(s) for the product(s). FIG. 4 is a dependency graph 400 for I™. Dependency graph 400 is created by merging the pre-req graphs of the ITM components, namely FIGS. 3A-E, described above. By way of example only, the pre-reqs graphs of two or more components can be merged to create a dependency graph for the product as follows:

(i) Let $R_i$, i=1, ..., N be the N components constituting the software product P and let $S_i$ be the set of pre-reqs for component $R_i$.

(ii) Let S be the set of all pre-reqs for P, i.e., $$S = \bigcup_{i=1}^{N} S_i.$$

(iii) Each component $R_i$, i=1, ..., N and each pre-req s∈S forms a node in the dependency graph of P. Thus there are two types of nodes in the dependency graph of P, component nodes and pre-req nodes. For each pre-req s∈S create an outgoing edge from s to each component for which s is a pre-req. This information is available from the individual pre-reqs graph of components. Thus there can be one or more than one outgoing edge from each pre-req s in the dependency graph of P.

Taking the process one step further, a dependency graph for the bundle may be created by merging the dependency graphs of the products (which is used to determine the consumability of the bundle, as per step 116). An exemplary approach to merge the dependency graphs of two or more products of a bundle to create a dependency graph of the bundle is as follows:

(i) Let $P_m$, m=1, ..., M be the M products constituting the software bundle B and let $\Omega_m$ be the set of nodes in the dependency graph of $P_m$. The nodes in $\Omega_m$ can either be pre-reqs of some component of $P_m$ or a component itself.

(ii) Let $\Omega$ the set of all nodes across the dependency graphs of all the products $P_m$, m=1, ..., M, i.e., $$\Omega = \bigcup_{m=1}^{M} \Omega_m.$$

(iii) For each pre-req node s∈Ω create an outgoing edge from s to each component node in Ω for which s is a pre-req. This information is available from the dependency graph of individual products. If a pre-req is common to components of two different products then if those components are different there will be two different edges from the pre-req to those components. However, if those components are the same then there will be only one instance of the component in the dependency graph of B and hence only one outgoing edge from the pre-req to this component.

Figure 6:
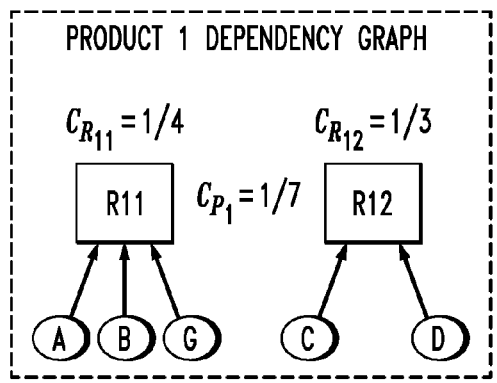
FIG. 6 is a dependency graph for an exemplary software Product 1 according to an embodiment of the present invention.
Figure 7:
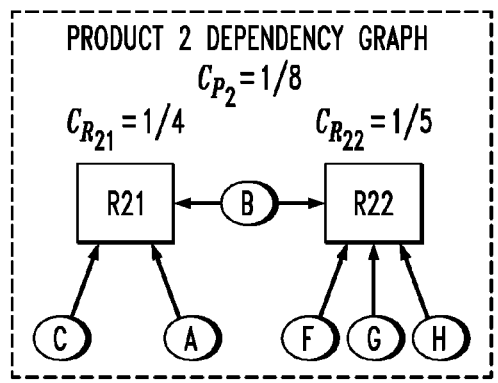
FIG. 7 is a dependency graph for an exemplary software Product 2 according to an embodiment of the present invention.
Figure 8:
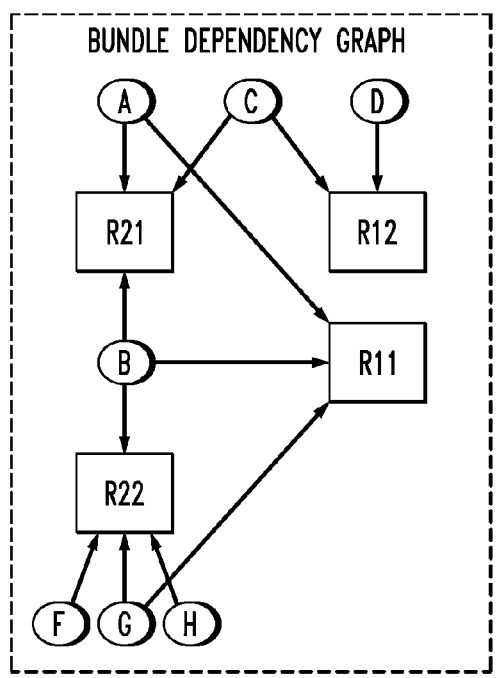
FIG. 8 is a diagram illustrating an exemplary bundle dependency graph according to an embodiment of the present invention.

The steps for construction of bundle dependency graph from dependency graph of products can be understood using FIGS. 6, 7 and 8. FIGS. 6 and 7 are dependency graphs of Product 1 and Product 2 and FIG. 8 is the dependency graph of the bundle consisting of Product 1 and Product 2 with the said bundle dependency graph created using the steps above.

Step 114 of methodology 100 then calls for quantifying the consumability of each of the products. The consumability of a product can be calculated by using the dependency graph as described above (i.e., wherein consumability is based on the number of pre-reqs or consumability is based on installation and configuration costs) depending upon the definition of product consumability. For example using Equation 1 (above) and the dependency graph for I™ from FIG. 4, the consumability of ITM ($C_{ITM}$) can be quantified as follows:

$$C_{ITM} = \frac{1}{C_{MS}^{-1} + C_{PS}^{-1} + C_{PDC}^{-1} + C_{PBC}^{-1} + C_{TEC}^{-1} - \underbrace{(4-1)}_{JRE} - \underbrace{(2-1)}_{IE} - \underbrace{(1-1)}_{DB2} - \underbrace{(3-1)}_{TCP/IP\ support}}$$

$$= \frac{1}{4+4+3+4+1-3-1-2}$$

$$= \frac{1}{10}.$$

Next, step 116 of methodology 100 calls for the consumability of the bundle to be determined. The consumability index of the bundle is some function of the consumability indices of the products constituting the bundle. Thus, if the consumability of a product increases then this will increase the consumability of the corresponding bundle.

The dependency graphs of different products constituting the bundle can be merged (as described above) to create a dependency graph for the bundle as a whole. If two products have the same pre-req then improving the consumability of that pre-req will improve the consumability of both the products in the bundle.

Figure 5:
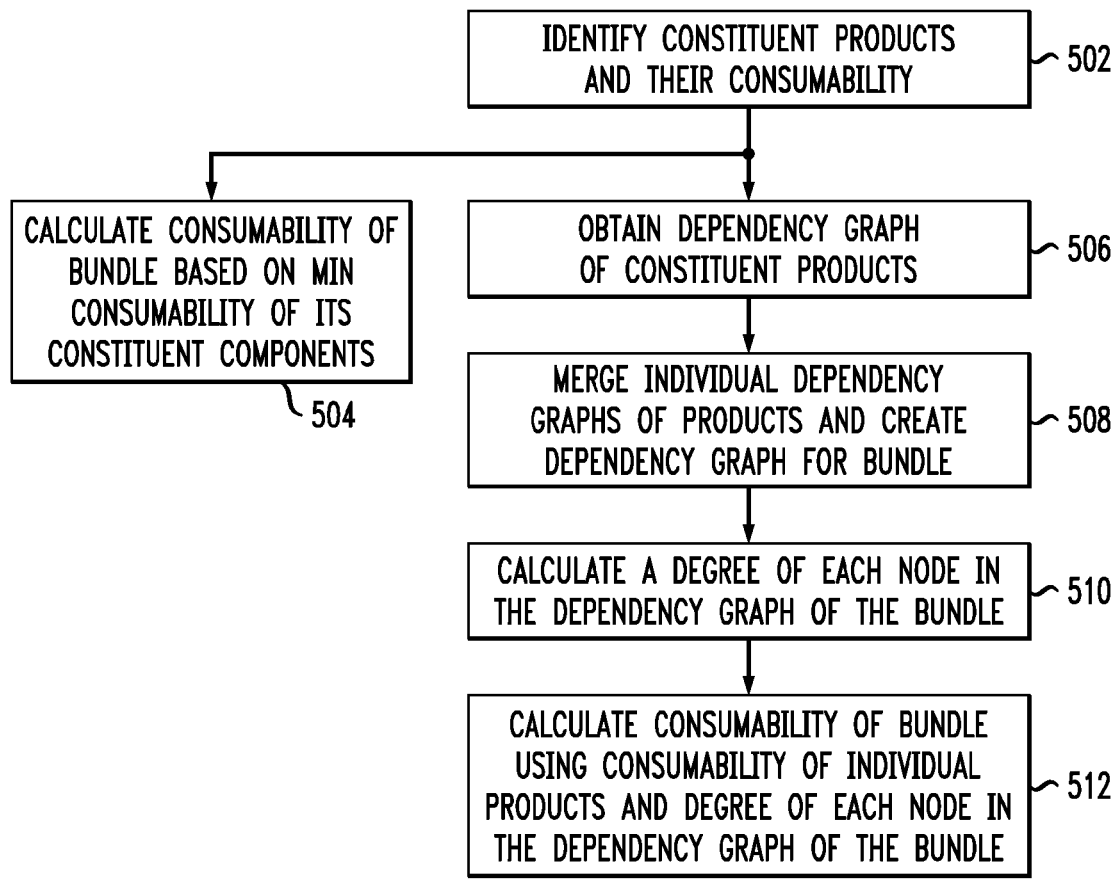
FIG. 5 is a diagram illustrating an exemplary methodology for quantifying the consumability of a software bundle according to an embodiment of the present invention.

FIG. 5 is a diagram illustrating exemplary methodology 500 for quantifying the consumability of a software bundle. Methodology 500 represents one exemplary implementation of methodology 100 of FIG. 1. In step 502, the constituent products of the bundle ($P_i$, i=1, ..., M) are identified, as are their constituent consumability indices ($C_{P_i}$, i=1, ..., M). The consumability index of the bundle ($C_{bundle}$) is then calculated based on the definition of consumability. According to one exemplary embodiment, in step 504, consumability of the bundle is defined as the minimum (min) consumability of its constituent components:

$$C_{bundle} = \min(C_{P_i}, i=1,\ldots,M). \quad (5)$$

According to another exemplary embodiment, consumability is defined as the number of distinct pre-reqs for the bundle where pre-reqs are both the software products and their components. Namely, in step 506, the dependency graphs of the constituent products are obtained. In step 508, the individual dependency graphs of the products are merged to create a dependency graph for the bundle, wherein a node in the dependency graph can be a product or its components.

In step 510, a degree of each node in the dependency graph of the bundle is calculated. The degree of a node is the number of outgoing connections. In step 512, the consumability of the bundle is calculated using the index of individual products and the degree of each node in the dependency graph of the bundle.

A non-limiting example is now provided to further illustrate methodology 500. Step 502 of methodology 500 calls for identifying the constituent products of the bundle and their constituent consumability indices. In this example, the bundle contains two constituent products (Product 1 and Product 2). Product 1 contains two components (R11 and R12). Product 2 also contains two components (R21 and R22).

FIG. 6 is a dependency graph 600 for Product 1. As shown in FIG. 6, component R11 has three pre-reqs A, B and G. Accordingly, the consumability of component R11 ($C_{R_{11}}$) is ¼. Component R12 has two pre-reqs C and D. Accordingly, the consumability of component R12 ($C_{R_{12}}$) is ⅓. Based on the consumability of each constituent component, the consumability of Product 1 ($C_{P_1}$) is ⅐.

FIG. 7 is a dependency graph 700 for Product 2. As shown in FIG. 7, component R21 has three pre-reqs A, B and C. Accordingly, the consumability of component R21 ($C_{R_{21}}$) is ¼. Component R22 has four pre-reqs B (which is a pre-req in common with R21), F, G and H. Accordingly, the consumability of component R22 ($C_{R_{22}}$) is ⅕. Based on the consumability of each constituent component, the consumability of Product 2 ($C_{P_2}$) is ⅛.

The consumability index of the bundle ($C_{bundle}$) is then calculated based on the definition of consumability. According to the first definition, step 504 of methodology 500 calls for defining consumability as the min consumability of its constituent components. In this particular example, consumability ($C_{bundle}$) would then be defined as follows:

$$C_{bundle} = \min(C_{P_1}, C_{P_2}) = \frac{1}{8}$$

According to the second definition, consumability is defined as the number of distinct pre-reqs for the bundle where pre-reqs are both the software products and their components. Step 506 of methodology 500 calls for obtaining the dependency graphs of the constituent products (see FIGS. 6 and 7), and step 508 calls for merging the individual dependency graphs of the products to create a dependency graph for the bundle. FIG. 8 is a diagram illustrating bundle dependency graph 800. Dependency graph 800 is created by merging dependency graphs 600 and 700 from Product 1 and Product 2, respectively. As shown in FIG. 8, each node in dependency graph 800 is either a component or its pre-reqs. In this particular example, consumability ($C_{bundle}$) would then be defined as follows:

$$C_{bundle} = \frac{1}{C_{R_{11}}^{-1} + C_{R_{12}}^{-1} + C_{R_{21}}^{-1} + C_{R_{22}}^{-1} - 2 - 1 - 1 - 1} = \frac{1}{11}$$

As described, for example, in conjunction with the description of step 118 of methodology 100, above, one or more dependencies can be removed so as to improve the consumability of the dependency graph for a given business scenario. By way of example only, dependencies between products can be removed. For instance, if two different versions of the same product are present in the dependency graph, then restructuring the dependency graph so that dependency on the lower versions are upgraded to dependencies on higher versions simplifies the graph and improves consumability.

A non-limiting example is now provided to further illustrate the concept of refining bundle consumability by removing dependencies. For ease of and consistency of description, the same exemplary products and components shown in FIGS. 6-8, described above, are used here as well. However, in this case, suppose D and H are the same pre-reqs, but version (D) is older than version (H). Product 1 can then be upgraded to work with H instead of D. This upgrade removes one node (D) from dependency graph 800 and also improves the consumability due to an increase in degree of node H (from 1 to 2).

Figure 9:
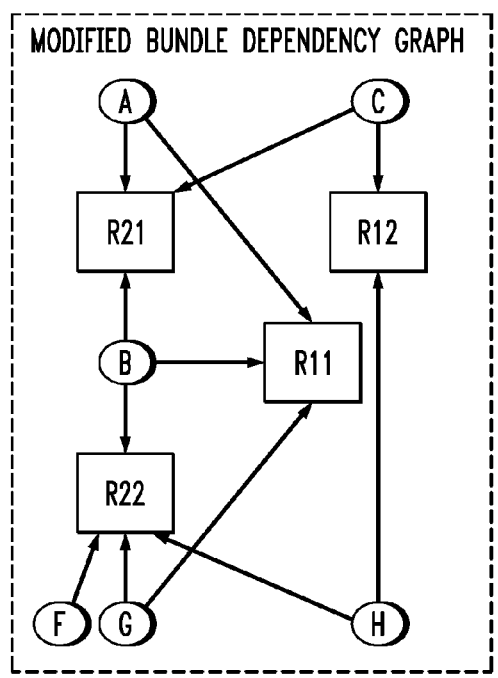
FIG. 9 is a diagram illustrating an exemplary modified bundle dependency graph according to an embodiment of the present invention.

FIG. 9 is a diagram illustrating modified bundle dependency graph 900. Dependency graph 900 is the result of modifying dependency graph 800 (of FIG. 8) to remove the dependency on older component D as described immediately above. Further, as described above, this upgrade increases the degree of node H. As a result, the consumability of the bundle ($C_{bundle}$) is now:

$$C_{bundle} = \frac{1}{C_{R_{11}}^{-1} + C_{R_{12}}^{-1} + C_{R_{21}}^{-1} + C_{R_{22}}^{-1} - 2 - 1 - 1 - 1 - 1} = \frac{1}{10}.$$

While consumability was described in the above examples as being based on number of pre-reqs and/or installation and configuration cost, any other measures of consumability may be employed. There are many different stakeholders associated with a given business scenario (see Kessler wherein stakeholders are defined as "the people who affect the success of [a] . . . software product, and are affected by it"). By way of example only, a stakeholder might be a customer (i.e., user) of a software bundle. Different stakeholders have different values for consumability measures depending on their business size, market, infrastructure, etc. Consider the business scenario of setting up a software bundle BU which requires installation of products A and B. Let there be two customers X and Y which require set up of BU. X already has A installed in its software infrastructure. Considering the consumability measure as the number of product installations, consumability of BU for X is ½ (X requires two installations: installation of B and BU) whereas for Y it's ⅓ (Y requires three installations: installation of A, B and BU). Thus, the same bundle BU has a different consumability measure for different customers. Consider another case where both X and Y have no prior installation of A or B. X needs setup of BU at its site in Delhi, India whereas Y needs BU setup at its New York site. Let the company Z selling BU maintains inventory at its New York facility. Then the cost of shipping the bundle to Delhi can be a part of the installation cost of BU to X. For Y this cost of shipping is negligible due to Y's geographical proximity to Z's New York facility. This is another example where the same bundle can have different consumability for different stakeholders.

Figure 10:
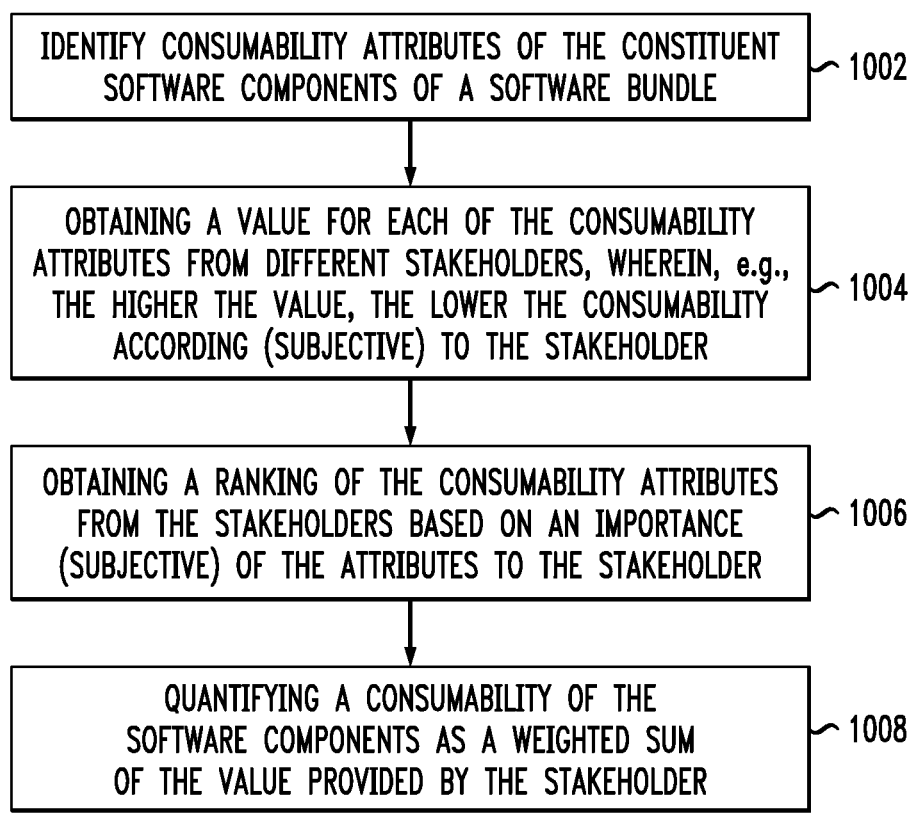
FIG. 10 is a diagram illustrating an exemplary methodology for accounting for different stakeholders' preferences in determining consumability according to an embodiment of the present invention.

A more general methodology 1000 of accounting for different stakeholders' preferences in determining consumability is given in FIG. 10. First, in step 1002, given a software bundle consisting of some constituent software components (see description of steps 102-106 from FIG. 1, above), for each of the constituent software components a set of consumability attributes (see Kessler) is identified. The term "constituent software components" here is inclusive of software products (as identified in 102), software components of the products (as identified in 104) and the pre-reqs of the components (as identified in 106). These consumability attributes can include, but are not limited to, number of pre-reqs, usage and administration, troubleshooting and updating (e.g., installing fix packs).

Information is then obtained from different stakeholders about their preferences regarding the consumability attributes for each of the constituent software components. Namely, in step 1004, different stakeholders are then asked to provide a value (e.g., a number between 0 and 100) for each of these consumability attributes for each of the constituent software components. The stakeholders can belong to different groups like principals, end-users, partners, and insiders (see Chapter 2 of Kessler for detailed discussion of different stakeholders of a software product). The value of a consumability attribute for a stakeholder depends on the group (e.g., principals, end-users, partners, and insiders) to which he/she belongs. The value can be a measure of the richness of the features supported by the software or a measure of the amount of effort (cost in terms of manhours, skills, etc.) required by the stakeholder for the particular operation (like installation, updating, etc.). According to an exemplary embodiment, the higher the value, the poorer the consumability is for that attribute.

In step 1006, the stakeholders are asked to provide a ranking among the different attributes which reflects the stakeholders' individual preferences for the attributes most important to them. The ranking can be expressed in quantitative terms (e.g., rank attributes 1, 2, 3, etc.) or qualitatively (e.g., rank attributes as more preferred, less preferred, etc.). Thus, by way of example only, an attribute ranked higher by a stakeholder may be valued more by him/her than a lower ranked attribute. In step 1008, subjective consumability of the constituent software component for a stakeholder can then be quantified as a weighted sum of the stakeholders' preferences, i.e., as a weighted sum of the value provided by the stakeholder for different attributes with the weight of an attribute being proportional to the importance of that attribute for the stakeholder's (subjective) consumability as exemplified by the stakeholders' ranking of different attributes (i.e., the weights reflect the ranks). The higher the rank (e.g., rank 1 is higher than rank 2), the more the relative importance of the corresponding consumability attribute for the stakeholder. Thus one can inflate/deflate the absolute value of different attributes according to their ranks to calculate the subjective consumability. For example if three attributes X, Y, Z are ranked 2, 3 and 1, respectively, and their values assigned as 30, 40, 100, then since Z is a more important attribute than X, and X is more important than Y, to calculate subjective consumability of the component, we can weigh value of Z by $3/6$, value of X by $2/6$ and value of Y by $1/6$ to get a subjective consumability value of the component as: $(3/6)*100+(2/6)*30+(1/6)*40=66.67$.

Knowing the subjective consumability of different constituent software components, the subjective consumability of the software bundle for each stakeholder can be calculated (see description of FIG. 1, above). Thus for the same scenario and software bundle there is a set of consumability indices each representing subjective consumability of the bundle for a particular stakeholder of that business scenario.

Thus, methodology 1000 takes into account stakeholder-specific attributes affecting consumability, and thereby permits these subjective factors to be used in creating a dependency graph for the software consumability and using this to calculate software consumability (as per methodology 100 of FIG. 1 or methodology 500 of FIG. 5). This can be achieved by providing an interface for the stakeholders to input their specific consumability attributes and using that to create stakeholder-specific dependency graphs to calculate stakeholder-specific consumability measure. Namely, once stakeholder-specific consumability data is obtained, the process creating dependency graphs and/or for determining consumability of components, products and/or bundles is the same as that described in conjunction with the description of methodology 100 of FIG. 1 and/or methodology 500 of FIG. 5, above.

To improve consumability aspects which uniformly satisfy all the stakeholders, one can use different solution techniques to identify different constituent software components, their consumability aspects and the amount of resources to invest so as to improve some overall measure of consumability. In principle any mechanism that resolves the effect of contradictory requirements can be used here, e.g., multicriteria optimization (pareto optimal solution), game theory solution concepts (Nash equilibrium solution, shapely value, etc.). All of these are examples of techniques to resolve contradictory requirements.

By way of example only, any conflict resolution mechanism can be applied to resolve the differences in consumability requirements (attributes and preferences) and thereby provide a single set of consumability requirements that uniformly satisfies all of the stakeholders. See for example, Grechanik et al., "Analyzing Software Development as a Noncooperative Game," $6^{th}$ International Workshop on Economics-Driven Software Engineering Research (EDSER6), Edinburgh, Scotland, UK, May 2004 (which involves applying Nash equilibrium techniques to resolve conflicting requirements from different stakeholders during the Software Development process), the contents of which are incorporated by reference herein.

After this an optimization problem is formulated and solved to identify the set of constituent software components (pre-reqs/components/products) to invest in for improving consumability and the amount of resources to allocate to each of them such that the consumability of the bundle improves the most after this investment. This gives the maximum return on investment where return is measured in terms of consumability improvement. For the case where the same bundle targets multiple business scenarios, the value of the bundle should also be taken into account in the optimization. The value is a measure of both the consumability aspects and the technical features offered by the solution. Different business scenarios attach different values to the same software bundle. In such a case investment in improving consumability should target consumability features which improve aggregate return on investment from the different scenarios where return can be some measure of aggregate consumability like weighted average with weights being proportional to the expected revenue from the scenario.

Figure 11:
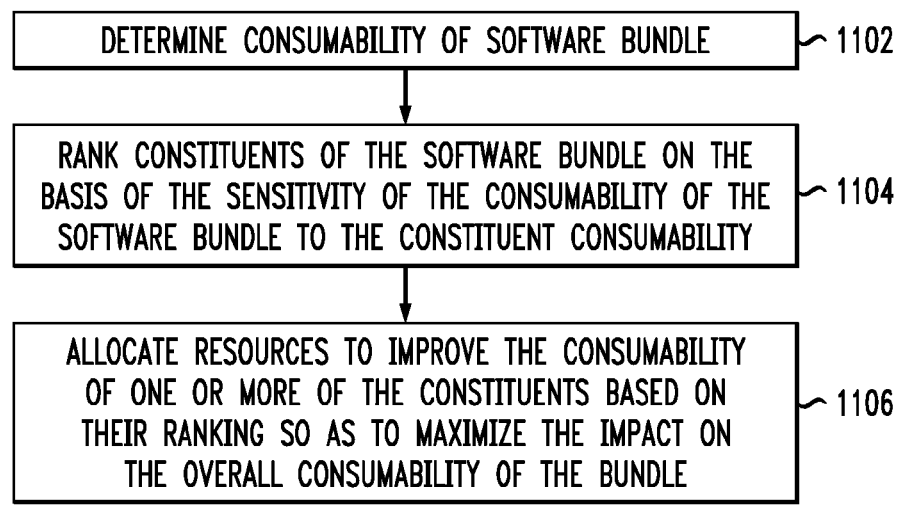
FIG. 11 is a diagram illustrating an exemplary methodology for using the consumability of a software bundle to identify a marginal change in the consumability of the software bundle due to unit change in consumability of one of its constituents according to an embodiment of the present invention.

By way of example only, the present techniques can be used to get a better return on investments to improve consumability. See, FIG. 11. FIG. 11, for example, is a diagram illustrating an exemplary methodology 1100 for using the consumability of a software bundle (determined using the present techniques) to identify a marginal change in the consumability of the software bundle due to unit change in consumability of one of its constituents (i.e., software components and/or products in the bundle).

Figure 12:
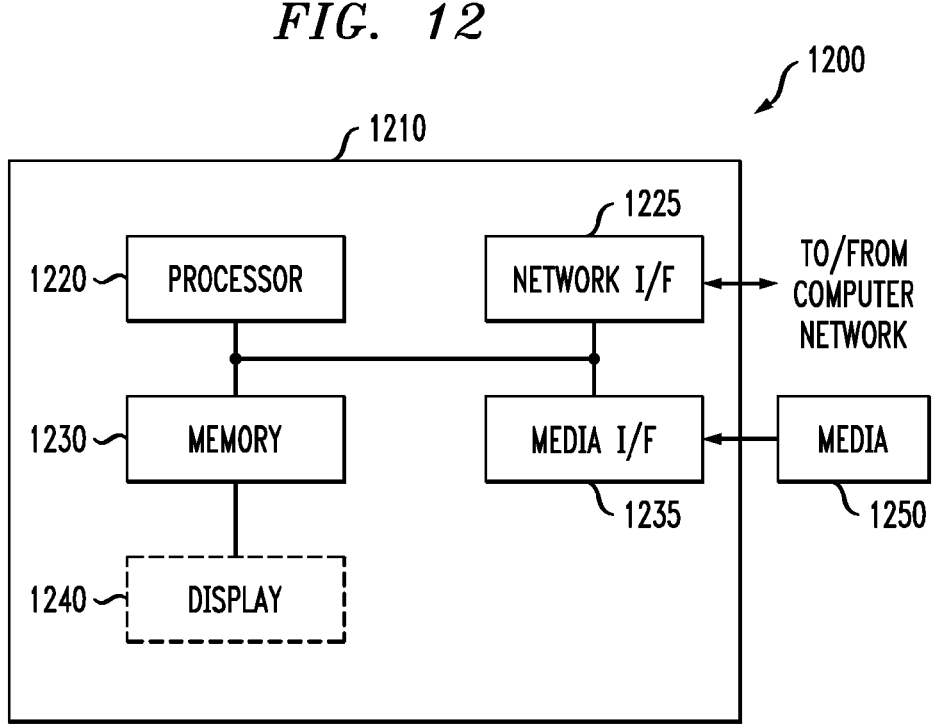
FIG. 12 is a diagram illustrating an exemplary apparatus for quantifying a consumability of a software bundle according to an embodiment of the present invention.

First, in step 1102, the consumability of the software bundle is determined (using, for example, methodology 100 of FIG. 1 and/or methodology 500 of FIG. 5, both described above). Then in step 1104 the constituents of the software bundle are ranked on the basis of the sensitivity of the consumability of the software bundle to the constituent consumability. Since consumability of a bundle can be expressed as a function of the consumability of its constituent software components (products, components of the products, pre-reqs of the components), and different products may have one or more common components, and different components may have one or more common pre-reqs, marginal improvement in consumability of different constituents can result in different amounts of marginal change in the consumability of the bundle. For example, among two components which are constituents of a bundle, improving consumability of the component which is used by multiple products in the bundle may improve the consumability of the bundle more than improvement in consumability of the component which is used by only one product in the bundle. Since the present techniques provide a quantitative approach to express consumability of a bundle in terms of the consumability of its constituents, one can easily quantify the sensitivity of bundle consumability to constituent consumability (for example, by studying first order change in bundle consumability with respect to constituent consumability using the equation for the bundle consumability). In step 1106, resources are allocated (or resource allocation recommendations are made) to improving the consumability of one or more of the constituents (components/products) based on their ranking so as to maximize the impact on the overall consumability of the bundle. For example, the top ranked constituent can be the constituent whose consumability has the most influence on the consumability of the bundle. Let's say there is a fixed budget to invest on improving the consumability of the software bundle. This sets up a constrained optimization problem, i.e., constraint is on the budget to improve bundle consumability and the goal is to maximize bundle consumability by investing the budget in improving the consumability of constituents of the bundle. One rational policy can be to invest as much as possible on improving the consumability of the first ranked constituent. If the budget is not completely consumed then invest as much as possible in improving the consumability of the second ranked constituent and so on. The availability of a function relating consumability to the amount invested enables formally optimizing the budget. Turning now to FIG. 12, a block diagram is shown of an apparatus 1200 for implementing one or more of the methodologies presented herein. By way of example only, apparatus 1200 can be configured to implement one or more of the steps of methodology 100 of FIG. 1 for quantifying a consumability of a software bundle.

Apparatus 1200 comprises a computer system 1210 and removable media 1250. Computer system 1210 comprises a processor device 1220, a network interface 1225, a memory 1230, a media interface 1235 and an optional display 1240. Network interface 1225 allows computer system 1210 to connect to a network, while media interface 1235 allows computer system 1210 to interact with media, such as a hard drive or removable media 1250.

As is known in the art, the methods and apparatus discussed herein may be distributed as an article of manufacture that itself comprises a machine-readable medium containing one or more programs which when executed implement embodiments of the present invention. For instance, when apparatus 1200 is configured to implement one or more of the steps of methodology 100 the machine-readable medium may contain a program configured to identify constituent software products of the bundle; identify software components an installation of which is a pre-requirement for an installation of the software products; identify software units an installation of which is a pre-requirement for an installation of the software components; create dependency graphs for the software components, wherein a dependency graph for a given one of the software components contains all of the software units the installation of which is a pre-requirement for the installation of the given software component; merge the dependency graphs for the software components to create dependency graphs for the software products, wherein a dependency graph for a given one of the software products contains all of the software units and software components the installation of which is a pre-requirement for the installation of the given software product; merge the dependency graphs for the software products to create a dependency graph for the software bundle, wherein the dependency graph for the software bundle contains all of the software units, software components and software products the installation of which is a pre-requirement for the installation of the software bundle; and use the dependency graph for the software bundle to quantify the consumability of the software bundle.

The machine-readable medium may be a recordable medium (e.g., floppy disks, hard drive, optical disks such as removable media 1250, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used.

Processor device 1220 can be configured to implement the methods, steps, and functions disclosed herein. The memory 1230 could be distributed or local and the processor device 1220 could be distributed or singular. The memory 1230 could be implemented as an electrical, magnetic or optical memory, or any combination of these or other types of storage devices. Moreover, the term "memory" should be construed broadly enough to encompass any information able to be read from, or written to, an address in the addressable space accessed by processor device 1220. With this definition, information on a network, accessible through network interface 1225, is still within memory 1230 because the processor device 1220 can retrieve the information from the network. It should be noted that each distributed processor that makes up processor device 1220 generally contains its own addressable memory space. It should also be noted that some or all of computer system 1210 can be incorporated into an application-specific or general-use integrated circuit.

Optional video display 1240 is any type of video display suitable for interacting with a human user of apparatus 1200. Generally, video display 1240 is a computer monitor or other similar video display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A computer-implemented method for quantifying a consumability of a software bundle, the method comprising the steps of:
   identifying constituent software products of the software bundle;
   identifying software components an installation of which is a pre-requirement for an installation of the software products;
   identifying software units an installation of which is a pre-requirement for an installation of the software components;
   creating dependency graphs for each of the software components, wherein a dependency graph for a given one of the software components contains all of the software units the installation of which is a pre-requirement for the installation of the given software component;
   using the dependency graphs for the software components to quantify a consumability of each of the software components;
   merging the dependency graphs for the software components to create dependency graphs for each of the software products, wherein a dependency graph for a given one of the software products contains all of the software units and software components the installation of which is a pre-requirement for the installation of the given software product;
   using the dependency graphs for the software products to quantify a consumability of each of the software products;
   merging the dependency graphs for the software products to create a dependency graph for the software bundle, wherein the dependency graph for the software bundle contains all of the software units, software components and software products the installation of which is a pre-requirement for the installation of the software bundle;
   using the dependency graph for the software bundle to quantify the consumability of the software bundle such that the consumability of the software bundle, which is a measure of customer experience with the software bundle, is quantified based on the consumability of the software products and the consumability of the software components that are constituents of the software bundle; and
   identifying a change in the consumability of the software bundle due to a change in the consumability of one of the software products or one of the software components that are the constituents of the software bundle;
   wherein the steps further comprise ranking the software components and software products based on a sensitivity of the consumability of the software bundle to the consumability of the software components and the consumability of the software products; and
   making resource allocation recommendations to improve the consumability of one or more of the software components and software products based on the ranking so as to maximize an impact on the consumability of the software bundle.

2. The method of claim 1, wherein the consumability of the software bundle is quantified based on a number of the software units, software components and software products the installation of which is a pre-requirement for the installation of the software bundle.

3. The method of claim 2, wherein the number of the software units, software components and software products the installation of which is a pre-requirement for the installation of the software bundle is inversely proportional to the consumability.

4. The method of claim 1, wherein the consumability of a given one of the software components is based on a number of the software units the installation of which is a pre-requirement for the installation of the given software component, and wherein the consumability of a given one of the software products is based on a number of the software units and software components the installation of which is a pre-requirement for the installation of the given software product.

5. The method of claim 1, wherein the consumability of a given one of the software components $s \in S_i$ is defined as:

$$\overline{C}_s = (c_{0,s} + c_{s,R_i})^{-1},$$

wherein $c_{0,s}$ is an installation cost of s and $c_{s,R_i}$ is a cost of integration of s with $R_i$,
wherein a consumability of component $R_i$ is given by:

$$\overline{C_{R_i}} = \left( \sum_{s \in S_i} (c_{0,s} + c_{s,R_i}) + c_{0,R_i} \right)^{-1},$$

wherein $C_{0,R_i}$ is the installation cost of $R_i$, and
wherein the consumability of a given one of the software products is given by:

$$\overline{C_{product}} = \frac{1}{\sum_{i=1}^{N} C_{R_i}^{-1} - \sum_{j=1}^{N} \sum_{s \in D_j} (j-1) c_{0,s}}.$$

6. The method of claim 1, further comprising the step of:
   removing one or more dependencies from the dependency graph for the software bundle to improve the consumability of the software bundle.

7. The method of claim 1, further comprising the steps of:
   identifying one or more consumability attributes of the software products, the software components and the software units; and
   using stakeholder preference information regarding the consumability attributes to quantify a consumability of the software products, the software components and the software units.

8. The method of claim 7, further comprising the step of:
   obtaining the stakeholder preference information from one or more stakeholders of the software bundle.

9. The method of claim 8, wherein the stakeholders comprise customers using the software bundle.

10. The method of claim 8, further comprising the step of:
    resolving conflicts in the stakeholder preference information obtained from the one or more stakeholders of the software bundle to provide a single set of consumability requirements that uniformly satisfies all of the stakeholders.

11. The method of claim 7, wherein the stakeholder preference information regarding the consumability attributes comprises a value of the consumability attributes based on i) an amount of effort on a part of a stakeholder, quantified in terms of manhours, involved in installing the software products, the software components and the software units, and ii) a ranking of the consumability attributes in terms of an importance of the consumability attributes to the stakeholders.

12. The method of claim 11, wherein the consumability of the software products, the software components and the software units is quantified as a weighted sum of the value of the consumability attributes which is proportional to the ranking of the consumability attributes.

13. The method of claim 1, further comprising the step of: providing an interface for customers to input specific consumability attributes.

14. The method of claim 1, wherein the consumability of the software components and the consumability of the software products are quantified by taking into account customer-specific consumability factors, and therefore the consumability of the software bundle accounts for customers having different measures of consumability.

15. An apparatus for quantifying a consumability of a software bundle, the apparatus comprising:
a memory; and
at least one processor device, coupled to the memory, operative to:
identify constituent software products of the software bundle;
identify software components an installation of which is a pre-requirement for an installation of the software products;
identify software units an installation of which is a pre-requirement for an installation of the software components;
create dependency graphs for each of the software components, wherein a dependency graph for a given one of the software components contains all of the software units the installation of which is a pre-requirement for the installation of the given software component;
use the dependency graphs for the software components to quantify a consumability of each of the software components;
merge the dependency graphs for the software components to create dependency graphs for each of the software products, wherein a dependency graph for a given one of the software products contains all of the software units and software components the installation of which is a pre-requirement for the installation of the given software product;
use the dependency graphs for the software products to quantify a consumability of each of the software products;
merge the dependency graphs for the software products to create a dependency graph for the software bundle, wherein the dependency graph for the software bundle contains all of the software units, software components and software products the installation of which is a pre-requirement for the installation of the software bundle;
use the dependency graph for the software bundle to quantify the consumability of the software bundle such that the consumability of the software bundle, which is a measure of customer experience with the software bundle, is quantified based on the consumability of the software products and the consumability of the software components that are constituents of the software bundle; and
identify a change in the consumability of the software bundle due to a change in the consumability of one of the software products or one of the software components that are the constituents of the software bundle;
and further operative to rank the software components and software products based on a sensitivity of the consumability of the software bundle to the consumability of the software components and the consumability of the software products; and
make resource allocation recommendations to improve the consumability of one or more of the software components and software products based on the ranking so as to maximize an impact on the consumability of the software bundle.

16. The apparatus of claim 15, wherein the at least one processor device is further operative to:
remove one or more dependencies from the dependency graph for the software bundle to improve the consumability of the software bundle.

17. An article of manufacture for quantifying a consumability of a software bundle, comprising a machine-readable recordable medium containing one or more programs which when executed implement the steps of:
identifying constituent software products of the software bundle;
identifying software components an installation of which is a pre-requirement for an installation of the software products;
identifying software units an installation of which is a pre-requirement for an installation of the software components;
creating dependency graphs for each of the software components, wherein a dependency graph for a given one of the software components contains all of the software units the installation of which is a pre-requirement for the installation of the given software component;
using the dependency graphs for the software components to quantify a consumability of each of the software components;
merging the dependency graphs for the software components to create dependency graphs for each of the software products, wherein a dependency graph for a given one of the software products contains all of the software units and software components the installation of which is a pre-requirement for the installation of the given software product;
using the dependency graphs for the software products to quantify a consumability of each of the software products;
merging the dependency graphs for the software products to create a dependency graph for the software bundle, wherein the dependency graph for the software bundle contains all of the software units, software components and software products the installation of which is a pre-requirement for the installation of the software bundle;
using the dependency graph for the software bundle to quantify the consumability of the software bundle such that the consumability of the software bundle, which is a measure of customer experience with the software bundle, is quantified based on the consumability of the software products and the consumability of the software components that are constituents of the software bundle; and
identifying a change in the consumability of the software bundle due to a change in the consumability of one of the software products or one of the software components that are the constituents of the software bundle;
wherein the steps further comprise ranking the software components and software products based on a sensitivity of the consumability of the software bundle to the consumability of the software components and the consumability of the software products; and
making resource allocation recommendations to improve the consumability of one or more of the software components and software products based on the ranking so as to maximize an impact on the consumability of the software bundle.

18. The article of manufacture of claim 17, wherein the one or more programs which when executed further implement the step of:

removing one or more dependencies from the dependency graph for the software bundle to improve the consumability of the software bundle.

* * * * *